US012739701B2

(12) United States Patent
Trivedi

(10) Patent No.: US 12,739,701 B2
(45) Date of Patent: Sep. 15, 2026

(54) APPARATUS AND METHOD FOR PROVIDING RESOURCE MANAGEMENT POLICY IN TELECOMMUNICATIONS SYSTEM

(71) Applicant: RAKUTEN MOBILE, INC., Tokyo (JP)

(72) Inventor: Siddhartha Trivedi, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 711 days.

(21) Appl. No.: 17/917,105

(22) PCT Filed: Jul. 28, 2022

(86) PCT No.: PCT/US2022/038695
§ 371 (c)(1),
(2) Date: Oct. 5, 2022

(87) PCT Pub. No.: WO2024/025538
PCT Pub. Date: Feb. 1, 2024

(65) Prior Publication Data
US 2024/0224118 A1 Jul. 4, 2024

(51) Int. Cl.
*H04W 28/08* (2023.01)
*H04L 41/0897* (2022.01)
*H04L 41/40* (2022.01)

(52) U.S. Cl.
CPC ..... *H04W 28/0925* (2020.05); *H04L 41/0897* (2022.05); *H04L 41/40* (2022.05)

(58) Field of Classification Search
CPC . H04W 28/0925; H04L 41/0897; H04L 41/40
(Continued)

(56) References Cited

U.S. PATENT DOCUMENTS

2013/0185438 A1 7/2013 Lumezanu et al.
2013/0219391 A1 8/2013 Lee et al.
(Continued)

FOREIGN PATENT DOCUMENTS

JP 2007-535206 A 11/2007

OTHER PUBLICATIONS

International Search Report dated Nov. 15, 2022 from the International Searching Authority in International Application No. PCT/US2022/038695.

(Continued)

*Primary Examiner* — Nicholas R Taylor
*Assistant Examiner* — Chong G Kim
(74) *Attorney, Agent, or Firm* — Sughrue Mion, PLLC

(57) ABSTRACT

An apparatus and method for implementing an rApp-based resource control mechanism for scaling a network function are provided. The apparatus may include a memory storing instructions; and at least one processor configured to execute the instructions to: receive data comprising at least one performance indicator from an O-CU in an O-Cloud computing environment, wherein the at least one performance indicator comprises a performance indicator of the O-CU; compare the least one performance indicator with a first predetermined threshold; receive and evaluate a resource status of at least one physical host in the O-Cloud computing environment; and create a resource management policy for allocating O-Cloud computing resources of the at least one physical host to scale the O-CU in at least one physical location in the O-Cloud computing environment based on the comparing and the evaluating.

17 Claims, 10 Drawing Sheets

(58) Field of Classification Search
USPC .......................................................... 370/329
See application file for complete search history.

(56) References Cited

U.S. PATENT DOCUMENTS

2015/0105094 A1 4/2015 Kotecha et al.
2016/0217403 A1 7/2016 Gupte et al.
2016/0234094 A1 8/2016 Balabine et al.
2018/0165167 A1 6/2018 Yang et al.
2021/0014737 A1* 1/2021 Yang ..................... H04W 76/11
2021/0204148 A1* 7/2021 Chou .................... H04W 24/02
2022/0014963 A1* 1/2022 Yeh ........................ G06N 3/045
2022/0052915 A1* 2/2022 Estevez ............... H04L 67/1031
2022/0407664 A1* 12/2022 Wang .................... H04L 5/0048
2023/0292291 A1* 9/2023 Huang .................. H04W 24/02
2024/0007921 A1* 1/2024 Seo ....................... H04W 24/02
2024/0015561 A1* 1/2024 Atawia ............... H04W 28/082
2024/0163727 A1* 5/2024 Chamarty ............. H04W 28/18
2024/0323089 A1* 9/2024 Baba ....................... H04L 41/40
2024/0378506 A1* 11/2024 D'Oro .................... G06N 20/00
2025/0294379 A1* 9/2025 Chenumolu ........ H04L 43/0811

OTHER PUBLICATIONS

Written Opinion dated Nov. 15, 2022 from the International Searching Authority in International Application No. PCT/US2022/038695.
O-RAN Alliance, "Cloudification and Orchestration Use Cases and Requirements for O-RAN Virtualized RAN", ORAN.WG6.ORCH-USE-CASES-v04.00, 2022, pp. 1-118 (119 pages).
Japanese Office Action dated Nov. 18, 2025, issued in Application No. 2025-504384.
O-RAN Alliance, "O-RAN Working Group 2 Non-RT RIC & A1 Interface: Use Cases and Requirements", O-RAN.WG2.Use-Case-Requirements-v06.00 Technical Specification, 2022, pp. 1-72.
O-Ran Working Group 6: "O2 Interface General Aspects and Principles" ORAN.WG6.02-GA&P-v01.02.01, 2022 (39 pages).
O-Ran WG2, "O-RAN WG2—Work Item Proposal—O-Cloud Resource Optimization", 2022 (8 pages).

* cited by examiner

FIG. 12

| STATUS (ONLINE/OFFLINE) | TOTAL CORES (Y% AVBL/ X TOTAL) | ISOLATED CORES (Y% AVBL/ X TOTAL) | DEDICATED CORES (Y% AVBL/ X TOTAL) | CPU STATUS (X%/Y%/Z%) | HDD ALLOCATION (Y AVBL/ X TOTAL) | SYSTEM USAGE (X%) | CLUSTER ROLE (MASTER/BACKUP/NORMAL) | OP STATUS (UNBARRED/MAINTENANCE) |
|---|---|---|---|---|---|---|---|---|
| ONLINE | 39/64 | 13/64 | 12/64 | 0/0/0 | 77/296G | 5 | 0/1/0 | 1/0 |
| ONLINE | 19/64 | 1964 | 6/64 | 0/0/0 | 70/296G | 5 | 0/1/0 | 1/0 |
| ONLINE | 36/64 | 10/64 | 18/64 | 0/0/0 | 78/296G | 5 | 0/1/0 | 1/0 |
| ONLINE | 47/64 | 3/64 | 18/64 | 0/0/0 | 81/296G | 5 | 0/1/0 | 1/0 |

APPARATUS AND METHOD FOR PROVIDING RESOURCE MANAGEMENT POLICY IN TELECOMMUNICATIONS SYSTEM

CROSS REFERENCE TO RELATED APPLICATIONS

This application is a National Stage of International Application No. PCT/US2022/038695 filed Jul. 28, 2022.

TECHNICAL FIELD

Apparatuses and methods consistent with example embodiments of the present disclosure relate to evaluating, controlling and executing of resource management control policies created by a modular applications (rApp) hosted in a radio access network (RAN) Intelligent Controller (RIC) within a Service Management and Orchestration (SMO) framework of a telecommunications network, and more particularly, to a method, an apparatus and a non-transitory computer readable storage medium storing instructions for executing the controlling and implementing of at least one resource management policy for allocating O-cloud computing resources to one or more centralized units (CU).

BACKGROUND

A radio access network (RAN) is an important component in a telecommunications system, as it connects end-user devices (or user equipment) to other parts of the network. The RAN includes a combination of various network elements (NEs) that connect the end-user devices to a core network. Traditionally, hardware and/or software of a particular RAN is vendor specific.

Open RAN (O-RAN) technology has emerged to enable multiple vendors to provide hardware and/or software to a telecommunications system. To this end, O-RAN disaggregates the RAN functions into a centralized unit (CU), a distributed unit (DU), and a radio unit (RU). The CU is a logical node for hosting Radio Resource Control (RRC), Service Data Adaptation Protocol (SDAP), and/or Packet Data Convergence Protocol (PDCP) sublayers of the RAN. The DU is a logical node hosting Radio Link Control (RLC), Media Access Control (MAC), and Physical (PHY) sublayers of the RAN. The RU is a physical node that converts radio signals from antennas to digital signals that can be transmitted over the FrontHaul to a DU. Because these entities have open protocols and interfaces between them, they can be developed by different vendors.

FIG. 1 illustrates a related art O-RAN architecture. Referring to FIG. 1, RAN functions in the O-RAN architecture are controlled and optimized by a RIC. The RIC is a software-defined component that implements modular applications to facilitate the multivendor operability required in the O-RAN system, as well as to automate and optimize RAN operations. The RIC is divided into two types: a non-real-time RIC (NRT RIC) and a near-real-time RIC (nRT RIC).

The NRT RIC is the control point of a non-real-time control loop and operates on a timescale greater than 1 second within the Service Management and Orchestration (SMO) framework. Its functionalities are implemented through modular applications called rApps (rApp 1, . . . , rApp N in FIG. 1), and include: providing policy based guidance and enrichment across the A1 interface, which is the interface that enables communication between the NRT RIC and the nRT RIC; performing data analytics; Artificial Intelligence/Machine Learning (AI/ML) training and inference for RAN optimization; and/or recommending configuration management actions over the O1 interface, which is the interface that connects the SMO to RAN managed elements (e.g., nRT RIC, O-RA centralized Unit (O-CU), O-RAN Distributed Unit (O-DU), etc.).

The nRT RIC operates on a timescale between 10 milliseconds and 1 second and connects to the O-DU, O-CU (disaggregated into the O-CU control plane (O-CU-CP) and the O-CU user plane (O-CU-UP)), and an open evolved NodeB (O-eNB) via the E2 interface. The nRT RIC uses the E2 interface to control the underlying RAN elements (E2 nodes/network functions (NFs)) over a near-real-time control loop. The nRT RIC monitors, suspends/stops, overrides, and controls the E2 nodes (O-CU, O-DU, and O-eNB) via policies. For example, the nRT sets policy parameters on activated functions of the E2 nodes. Further, the nRT RIC hosts xApps to implement functions such as quality of service (QOS) optimization, mobility optimization, slicing optimization, interference mitigation, load balancing, security, etc. The two types of RICs work together to optimize the O-RAN. For example, the NRT RIC provides, over the A1 interface, the policies, data, and AI/ML models enforced and used by the nRT RIC for RAN optimization, and the nRT returns policy feedback (i.e., how the policy set by the NRT RIC works).

The SMO framework, within which the NRT RIC is located, manages and orchestrates RAN elements. Specifically, the SMO manages and orchestrates what is referred to as the O-Ran Cloud (O-Cloud). The O-Cloud is a collection of physical RAN nodes that host the RICs, O-CUs, and O-DUs, the supporting software components (e.g., the operating systems and runtime environments), and the SMO itself. In other words, the SMO manages the O-Cloud from within. The O2 interface is the interface between the SMO and the O-Cloud it resides in. Through the O2 interface, the SMO provides infrastructure management services (IMS) and deployment management services (DMS).

O-Cloud resource control mechanisms in the related art monitor the traffic of a CU to determine whether to expand or contract its instantiations. That is, related art auto-scaling can expand or contract a deployed O-CU application (or instance) based on traffic utilization. However, this approach provides for an insufficient O-Cloud resource management in case of a sudden traffic surge, because the resource management is limited to auto-scaling within the same data center without considering the status and load of resources of the underlying hardware infrastructure. As a result, a sudden traffic surge at a single data center can cause a resource shortage as all O-CU applications attempt to scale up. In other words, despite an unutilized server infrastructure (e.g., data centers) within the topology of the O-RAN network, the O-CU auto-scaling is concentrated within its own data center.

SUMMARY

According to embodiments, systems and methods are provided for evaluating, controlling and executing of centralized resource management control policies created by a modular application (rApp) hosted in a radio access network (RAN) Intelligent Controller (RIC), wherein the modular application collects at least one O-RAN resource indicator over the entire O-RAN network topology, compares performance indicators of the O-RAN based on predetermined thresholds and controls and implements the allocation and re-allocation of O-Cloud resources by evaluating resource states of the physical hosts within the O-RAN network topology, thereby realizing a more balanced utilization of O-Cloud computational resources to allow an energy efficient network operation.

According to an embodiment, an apparatus for implementing an application hosted in a radio access network (RAN) Intelligent controller (RIC) within a Service Management and Orchestration (SMO) framework of a telecommunications network, the apparatus comprises: a memory storing instructions; and at least one processor within the SMO framework for implementing the RIC, the at least one processor configured to execute the instructions to: receive data comprising at least one performance indicator from an Open RAN (O-RAN) centralized unit (O-CU) in an O-Cloud computing environment, wherein the at least one performance indicator comprises a performance indicator of the O-CU; compare the least one performance indicator with a first predetermined threshold; receive and evaluate a resource status of at least one physical host in the O-Cloud computing environment; and create a resource management policy for allocating O-Cloud computing resources of the at least one physical host to scale the O-CU in at least one physical location in the O-Cloud computing environment based on the comparing and the evaluating.

The at least one processor may be configured to execute the instructions to: receive an additional performance indicator of the O-CU, compare the additional performance indicator of the O-CU to a second predetermined threshold, and determine to scale down by terminating the additional O-CU based on the comparing.

Based on the compared at least one performance indicator comprising a performance indicator of an O-CU control plane (CP), the resource management policy may be for allocating O-Cloud computing resources to scale the O-CU CP; and based on the compared at least one performance indicator comprising a performance indicator of an O-CU user plane (UP), a resource management policy for allocating O-Cloud computing resources to scale the O-CU UP.

The performance indicator of the O-CU CP may include a number of connected devices, and the performance indicator of the O-CU UP may include an amount of traffic or a number of active devices.

The at least one processor may be further configured to execute the instructions to: create the resource management policy based on location information of the at least one physical host, to consider a shortest path to move traffic based on available resources.

The at least one processor may be further configured to execute the instructions to: based on N number of instantiated O-CUs in accordance with the resource management policy, implement a failsafe policy in which a single additional redundancy is instantiated as a failsafe for the N number of instantiated O-CUs.

The resource management policy may be for upscaling the O-CU by instantiating an additional O-CU at a physical host at a different data center than a data center of the O-CU, based on the evaluated resource status of physical hosts in the data center of the O-CU.

The resource states of the at least one physical host may include a processor load, a memory usage, and a hard disk drive usage of the at least one physical host.

According to another embodiment, a method, performed by an application hosted in a radio access network (RAN) Intelligent controller (RIC) within a Service Management and Orchestration (SMO) framework of a telecommunications network, for implementing a resource control mechanism, may include: receiving data comprising at least one performance indicator from an Open RAN (O-RAN) centralized unit (O-CU) in an O-Cloud computing environment, wherein the at least one performance indicator comprises a performance indicator of the O-CU; comparing the least one performance indicator with a first predetermined threshold; receiving and evaluate a resource status of at least one physical host in the O-Cloud computing environment; and creating a resource management policy for allocating O-Cloud computing resources of the at least one physical host to scale the O-CU in at least one physical location in the O-Cloud computing environment based on the comparing and the evaluating.

According to another embodiment, a non-transitory computer-readable recording medium within a Service Management and Orchestration (SMO) framework of a telecommunications network, having recorded thereon instructions executable by at least one processor to perform a method of implementing a resource control mechanism, the method may include: receiving data comprising at least one performance indicator from an Open RAN (O-RAN) centralized unit (O-CU) in an O-Cloud computing environment, wherein the at least one performance indicator comprises a performance indicator of the O-CU; comparing the least one performance indicator with a first predetermined threshold; receiving and evaluate a resource status of at least one physical host in the O-Cloud computing environment; and creating a resource management policy for allocating O-Cloud computing resources of the at least one physical host to scale the O-CU in at least one physical location in the O-Cloud computing environment based on the comparing and the evaluating.

BRIEF DESCRIPTION OF THE DRAWINGS

Features, aspects and advantages of certain exemplary embodiments of the disclosure will be described below with reference to the accompanying drawings, in which like reference numerals denote like elements, and wherein:

FIG. 12 illustrates a table showing resource statuses of vCU servers in an O-Cloud computing environment.

DETAILED DESCRIPTION

Figure 1:
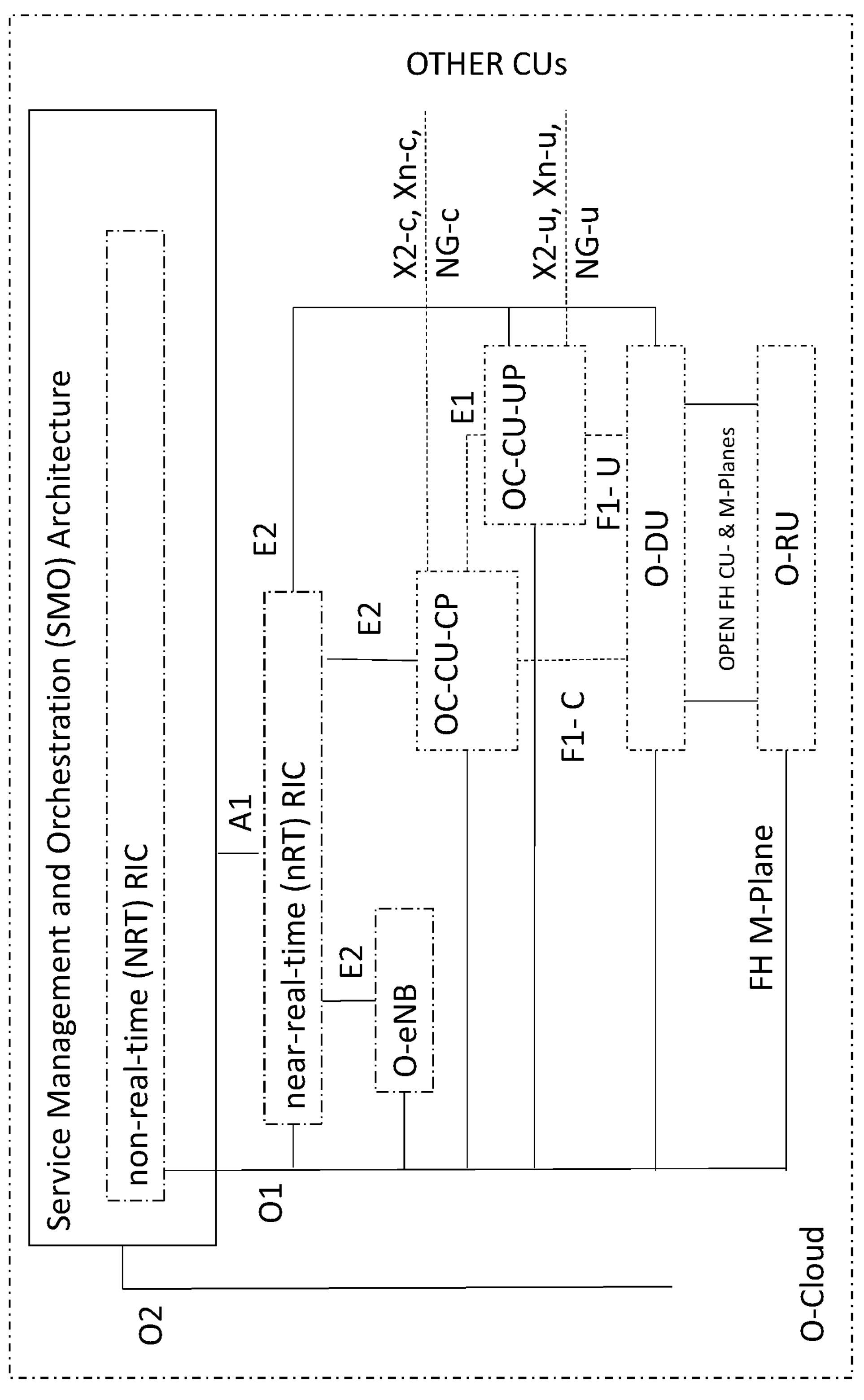
FIG. 1 illustrates an O-RAN architecture in the related art.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Example embodiments of the present disclosure provide a modular application (rApp) hosted in a radio access network (RAN) Intelligent Controller (RIC) and providing an auto-scaling of O-CUs that considers both traffic utilization indicators as well as underlying hardware resources of the O-Cloud infrastructure on which the O-CUs are deployed to determine where to scale an O-CU across an entire network topology. As a result, a sudden traffic surge does not create a resource shortage at a single data center, since the rApp-based O-CU auto-scaling in accordance with example embodiments is based on the resource status of a data center and can determine to scale up an O-CU at a different data center.

An rApp according to example embodiments considers O-CU performance indicators as well as cloud resources to calculate or determine how many new application instantiations or resources are required, and select a cloud cluster at which to deploy the new application (e.g., O-CU Control Plane and/or User Plane) instantiation.

Methods and apparatuses in accordance with example embodiments realize a more balanced utilization of O-Cloud computational resources of the O-Cloud environment in order to allow an energy efficient network.

Figure 2:
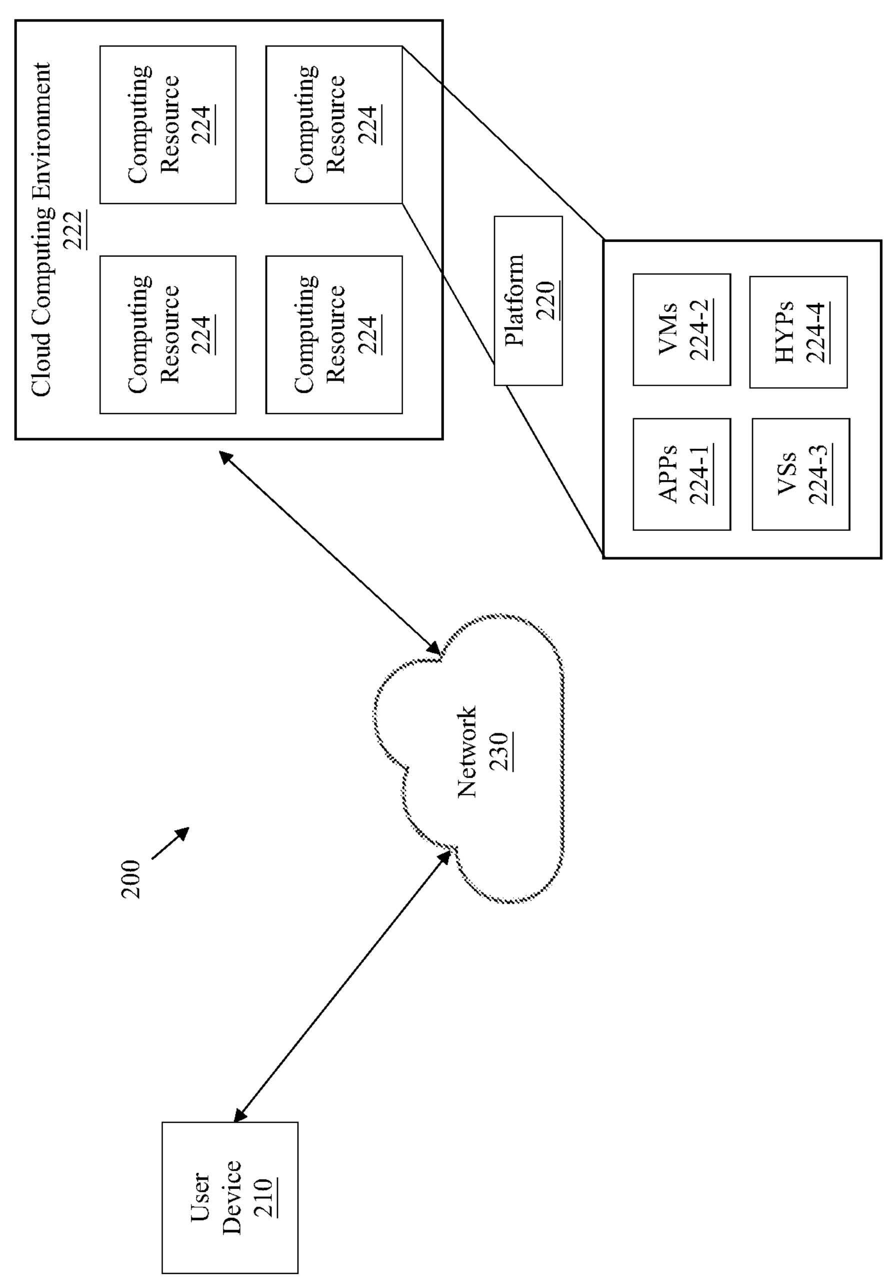
FIG. 2 is a diagram of an example environment in which systems and/or methods, described herein, may be implemented.
Figure 3:
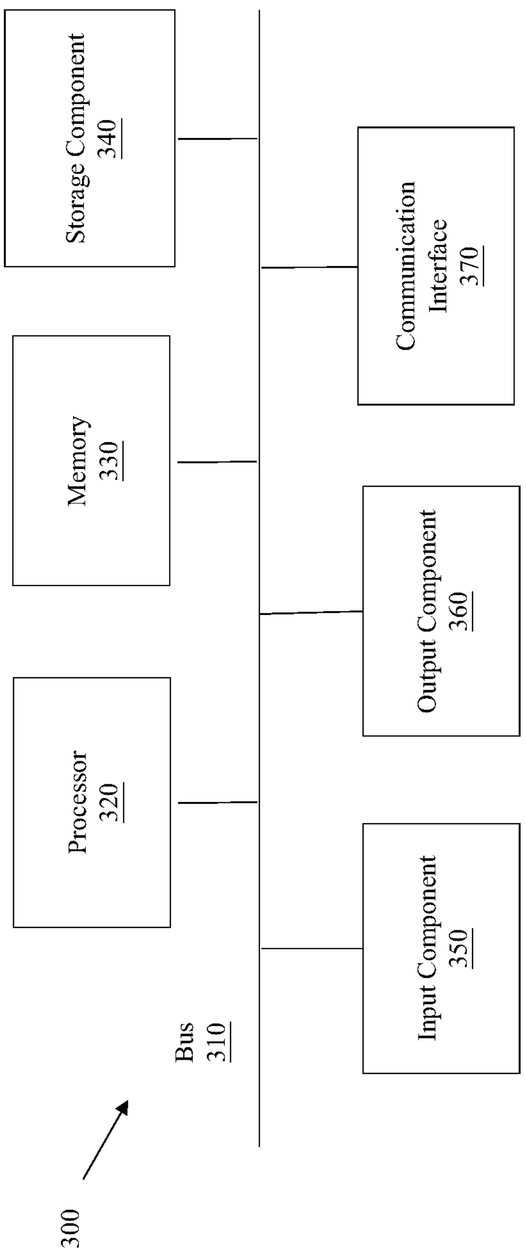
FIG. 3 is a diagram of example components of a device according to an embodiment.

FIG. 2 is a diagram of an example environment 200 in which systems and/or methods, described herein, may be implemented. As shown in FIG. 3, environment 200 may include a user device 210, a platform 220, and a network 220. Devices of environment 200 may interconnect via wired connections, wireless connections, or a combination of wired and wireless connections. In embodiments, any of the functions and operations described with reference to FIGS. 4 through 12 below may be performed by any combination of elements illustrated in FIG. 3.

User device 210 includes one or more devices capable of receiving, generating, storing, processing, and/or providing information associated with platform 220. For example, user device 210 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 210 may receive information from and/or transmit information to platform 220.

Platform 220 includes one or more devices capable of receiving, generating, storing, processing, and/or providing information. In some implementations, platform 220 may include a cloud server or a group of cloud servers. In some implementations, platform 220 may be designed to be modular such that certain software components may be swapped in or out depending on a particular need. As such, platform 220 may be easily and/or quickly reconfigured for different uses.

In some implementations, as shown, platform 220 may be hosted in cloud computing environment 222. Notably, while implementations described herein describe platform 220 as being hosted in cloud computing environment 222, in some implementations, platform 220 may not be cloud-based (i.e., may be implemented outside of a cloud computing environment) or may be partially cloud-based.

Cloud computing environment 222 includes an environment that hosts platform 220. Cloud computing environment 222 may provide computation, software, data access, storage, etc., services that do not require end-user (e.g., user device 210) knowledge of a physical location and configuration of system(s) and/or device(s) that hosts platform 220. As shown, cloud computing environment 222 may include a group of computing resources 224 (referred to collectively as "computing resources 224" and individually as "computing resource 224").

Computing resource 224 includes one or more personal computers, a cluster of computing devices, workstation computers, server devices, or other types of computation and/or communication devices. In some implementations, computing resource 224 may host platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that may be provided to or accessed by user device 210. Application 224-1 may eliminate a need to install and execute the software applications on user device 210. For example, application 224-1 may include software associated with platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., user device 210), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 220 includes one or more wired and/or wireless networks. For example, network 220 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
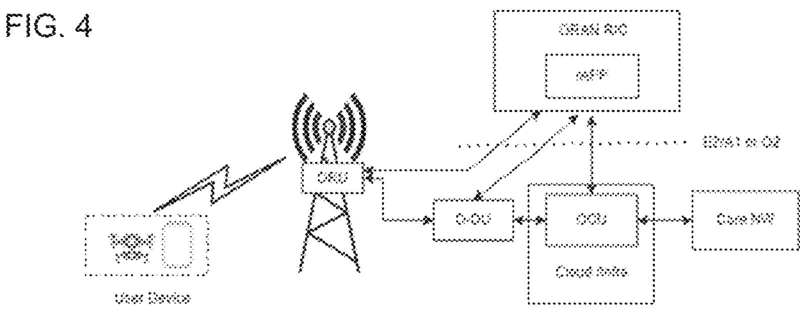
FIG. 4 is a diagram of a system architecture according to an embodiment.

FIG. 4 is a diagram of example components of a device 300. Device 300 may correspond to user device 210 and/or platform 220. As shown in FIG. 4, device 300 may include a bus 310, a processor 320, a memory 320, a storage component 330, an input component 350, an output component 360, and a communication interface 370.

Bus 310 includes a component that permits communication among the components of device 300. Processor 320 may be implemented in hardware, firmware, or a combination of hardware and software. Processor 320 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 320 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 330 stores information and/or software related to the operation and use of device 300. For example, storage component 330 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 320 and/or storage component 330. A computer-readable medium is defined herein as a non-transitory memory device. A memory device includes memory space within a single physical storage device or memory space spread across multiple physical storage devices.

Software instructions may be read into memory 320 and/or storage component 330 from another computer-readable medium or from another device via communication interface 370. When executed, software instructions stored in memory 320 and/or storage component 330 may cause processor 320 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 300 may include additional components, fewer components, different components, or differently arranged components than those shown in FIG. 4. Additionally, or alternatively, a set of components (e.g., one or more components) of device 300 may perform one or more functions described as being performed by another set of components of device 300.

In embodiments, any one of the operations or processes of FIGS. 5 to 12 may be implemented by or using any one of the elements illustrated in FIGS. 3 and 4.

FIG. 4 is a diagram of a system architecture in accordance with an example embodiment. Referring to FIG. 4, the system architecture includes an Open Radio Access Network (O-RAN) radio unit (O-RU), an O-RAN distributed unit (O-DU), an O-RAN centralized unit (O-CU), and an application (rApp) hosted in a O-RAN intelligent controller (RIC) for managing O-CU resource utilization based on cloud resource availability. As set forth above, the O-CU is an application that is deployed in a cloud platform (O-Cloud) and instantiated on a physical host (i.e., server) in a data center.

That is, the O-CU is allocated to a particular topology in the O-RAN network. This topological location is, for example, a data center. Such a data center accommodates the physical hardware server infrastructure that hosts the O-Cloud environment, and more particularly, the data center accommodate at least one virtualized CU (vCU) server hosting virtual machines running O-CU applications of a vCU cluster. A vCU cluster can be hosted on at least one vCU server in at least one data center.

Figure 6:
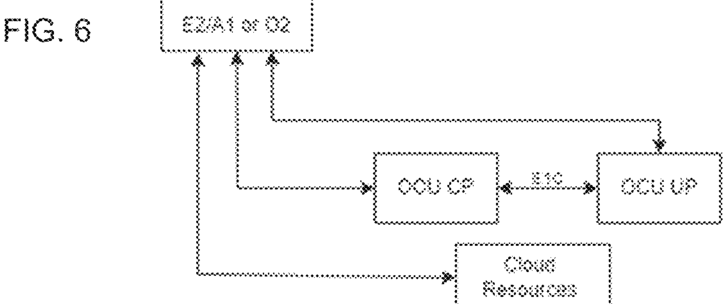
FIG. 6 is a diagram illustrating an information flow according to an embodiment.

The at least one vCU server, for example, is a physical host comprising computing resources 224 of an O-Could computing environment as shown in FIG. 6. The data center, for example, is at least one physical host location of such physical host in the O-Cloud computing environment (such as shown in FIG. 6).

The physical host, for example, hosts at least one O-CU node and/or a cluster of O-CU nodes of the O-RAN. An O-CU node is an O-CU of an O-RAN network according to FIGS. 1 to 5 running O-CU applications in the O-Cloud computing environment.

As shown in FIG. 1, the various network elements and RICs of the O-RAN architecture are connected via interfaces, including A1, O1, O2, CU-Plane, M-Plane, F1, E1, E2, X2 and Xn.

The near-RT RIC may obtain performance indicators (or key performance indicators (KPIs)) via the E2 interface. The performance indicator collection may pertain to one or more cells, slices, QoS classes, or specific UEs. To this end, the near-RT RIC may directly connect to the O-eNB, the O-CU's control plane (C-Plane), the O-CU's user plane (U-Plane), and the O-DU. In the O-CU, the C-Plane and U-Plane are running control and user functions, respectively. The C-Plane and U-Plane are connected via the E1 interface. Moreover, the C-Plane and U-Plane are connected via the F1 interface to the O-DU, with dedicated sub-interfaces F1-u and F2-c, respectively. The O-CU communicates to other O-CUs via the Xn (X2) interface that connects different gNBs and/or eNBs. Furthermore, the NG interface connects the gNB to the 5G core. Both, the Xn (X2) and NG interfaces have dedicated sub-interfaces to connect to the O-CU's C-Plane and U-Plane, respectively.

FIG. 6 is a diagram of an example environment of data centers accommodating vCU servers hosting clusters of O-CUs. At least one O-DU is connected to an O-CU. The O-DU includes baseband processing and able to support one or more cells. This means that based on the topological hierarchy of the radio network resulting from the location of the radio antennas forming the cells, the location of accommodating an O-DU, hosted on at least one vDU server, and the location of a vCU cluster hosted by at least one vCU server are predetermined in accordance with the total network topology of the cells and beams. For example, cells in Yokohama are radio controlled by a vCU cluster hosted by at least one vCU server in a data center in Yokohama. Thus, although the O-Cloud environment is not dependent on the network topology, a data center accommodating vCu clusters has a predetermined geographic location based on the network topology in the real world.

The modular application (rApp) monitors the performance of each O-CU in said vCu clusters and controls and implements resource management policies based on the performance indicators of the O-CU's C-Plane and the U-Plane applications in each vCu cluster. For example, the performance indicator of the O-CU UP may include at least one of an amount of traffic through the O-CU UP or a number of active devices connected to the O-CU. The performance indicator of the O-CU CP may include a number of devices connected to the O-CU. Further, the rApp implements resource management policies based on C/U-Plane stats, which include cloud resource information or statuses. The cloud resource information is information regarding the resource utilization of the underlying cloud infrastructure (i.e., physical nodes) of the clusters in which the O-CU C/U-Planes are instantiated. This information may include, by way of example, how much memory is being used, processor load, how much hard disk drive space is being used, etc. The rApp may receive the performance indicators and the resource information from at least one of the E2, A1 and O2 interfaces.

FIG. 6 illustrates an information flow according to an embodiment. Referring to FIG. 6, performance indicators of the O-CU C-Plane (CP) and the O-CU U-Plane (UP), as well as cloud resource information (or statuses) are provided to the rApp according to an embodiment via at least one of the E2, A1, and the O2 interfaces. In one or more embodiments, the O-CU CP will request the O-CU UP performance indicators from the O-CU UP and send the same to the rApp.

Figure 7:
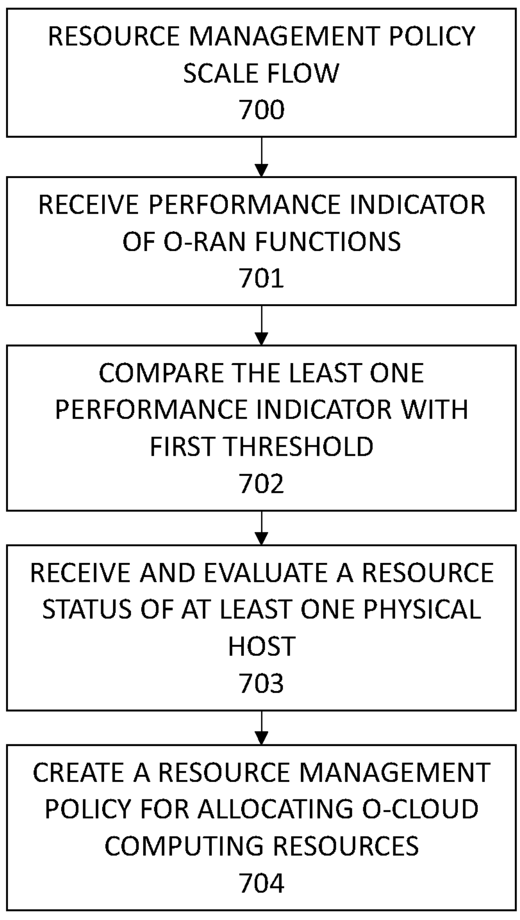
FIG. 7 shows a flowchart of a method of creating a resource management policy for allocating O-Cloud computing resources to scale an O-CU according to an embodiment.

FIG. 7 shows a flowchart of a method 700 of creating a resource management policy according to an embodiment. Referring to FIG. 7, in step 701, a modular application (rApp) receives a performance indicator of an O-RAN function. This performance indicator of an O-RAN function, for example, is a performance indicator of the O-CU U-Plane that may include an amount of traffic or a number of active devices and/or a performance indicator of the O-CU C-Plane that may include, for example, a relevant parameter (e.g., number of connected devices) to trigger whether an O-CU should be up scaled or down scaled.

In step 702, the performance indicator is compared with a threshold to determine whether the modular application (rApp) should request or control to perform the scaling of an O-CU. Here, for the comparison in step 702, the threshold may be a first threshold that triggers a down-scaling request from the modular application (rApp) or a second threshold that triggers an up-scaling request from the modular application (rApp). The first threshold and the second threshold may be a same threshold value or different threshold values.

In step 703, the modular application (rApp) receives and evaluates a resource status of at least one physical host (e.g., the physical host accommodating the O-CU to be scaled). The modular application (rApp) receives a resource status from at least one physical host for accommodating O-Cloud computing resources ready to be allocated to, or allocated to, the O-CU. In some embodiments, step 703 may be performed based on or in response the comparison in step 702, though it is understood that one or more other embodiments are not limited thereto. For example, in another embodiment, the resource status may be received independently or irrespectively of the result of the comparison in step 702.

The resource status, for example, may include at least one of a processor load, a memory usage, a hard disk drive usage, etc., of the at least one physical host within the topology of the O-RAN network. Further, the resource status may be pushed to the rApp (e.g., periodically or continuously) or may be pulled by the rApp (e.g., by periodic request, by event-triggered request (e.g., based on the threshold determination of step 702), etc.). By way of example, the resource status may be obtained from a "Resource Status Request/Response" information element (IE) pursuant to 3GPP standards.

In step 704, the modular application (rApp) creates the resource management policy for allocating O-Cloud computing resources of the at least one physical host to one or more O-CU nodes to scale a O-CU in at least one physical location in the O-Cloud computing environment based on the comparing (e.g., in step 702) and the evaluating (e.g. in step 703). By way of example, the determination to scale may be based on the comparison of step 702, and the determination of the server or data center location in the O-Cloud platform at which to instantiate an O-CU per the scaling may be based on the evaluation of step 703.

Figure 5:
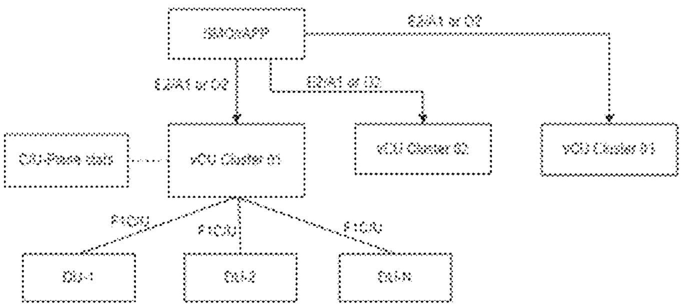
FIG. 5 is a diagram of an example environment of O-RAN nodes in which systems and/or methods, described herein, may be implemented.

By way of example, a data center in Yokohama accommodates the least one vCU server hosting the vCU cluster 01 as shown in FIG. 5. If a sudden spike of connected/active user equipment (UE) or traffic occurs, the modular application (rApp) compares that performance indicator(s) with one or more thresholds and evaluates the topological confinement of that spike by using a metric of a resource state, i.e. the "Resource Status Request/Response" IE, based on the O-RAN network topology. In this case, if the performance indicator exceeds the threshold per the comparison, but the resource status evaluation (e.g., comparisons to one or more resource thresholds based on which a determination of availability of hardware/cloud resources for O-CU instantiation is made) indicates that the Yokohama data center does not have sufficient resources for a newly instantiated O-CU, the rApp may evaluate resource statuses of other data centers to determine another data center with sufficient resource availability to scale up the O-CU. Here, the rApp may also consider other factors, such as location information, to determine a location for the O-CU instantiation that would provide for the shortest path to move traffic.

In accordance with an example embodiment, the rApp may provide the policy to an operational support system (OSS) to generate the scaling configuration and control to perform the scaling.

Figure 8:
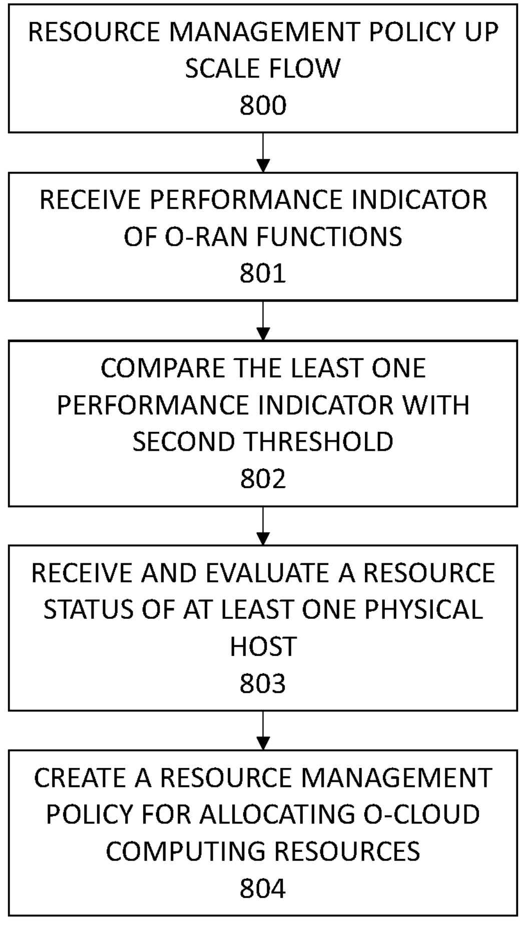
FIG. 8 shows a flowchart of a method of creating a resource management policy for allocating O-Cloud computing resources to scale up an O-CU according to an embodiment.

FIG. 8 shows a flowchart of a method 800 of creating a resource management policy for allocating O-Cloud computing resources to scale up an O-CU according to an embodiment. Referring to FIG. 8, similar to step 701, the modular application (rApp) obtains a performance indicator of an O-RAN function at step 801. In step 802, similar to step 702, the modular application (rApp) compares the performance indicator with a second threshold for up-scaling. The second threshold for up-scaling may be the same as the first threshold for down-scaling. However, both thresholds may be different from each other to provide for a more flexible up- or down-scaling procedure.

In step 803, the modular application (rApp) obtains and evaluates a resource status of at least one physical host accommodating O-Cloud computing resources ready to be allocated to, or allocated to, the O-CU.

In step 804, the modular application (rApp) creates a resource management policy for allocating O-Cloud computing resources of the at least one physical host to up-scale the O-CU in at least one physical location in the O-Cloud computing environment based on the comparing (e.g., in step 802) and the evaluating (e.g., in step 803).

By way of example, in accordance with the up-scaling flow in FIG. 8, in case there is an unforeseeable event that causes a sudden spike of UE traffic or any other factor that makes it necessary to up-scale a O-CU in the Yokohama area, the modular application (rApp) obtains the "Resource Status Response" IE or other resource states. Based on an evaluation of said resource status the modular application (rApp) creates resource management policy. The resource management policy may be a set of commands to allocate O-Cloud resources of other vCU clusters in the network topology to the vCU cluster O1 in the Yokohama area. In other words, the resource management policy is a set of commands to instantiate new O-CU applications on at the least one vCU server. The vCU server(s) to instantiate new O-CU applications may be at a different location from the location of the original O-CU.

In case the vCU server hardware infrastructure resources reach a maximum level at the data center in Yokohama, the modular application (rApp) obtains and evaluates resource statuses of vCU servers hosting, for example, the vCU cluster 02 in Kawasaki or any other location next to the vCU cluster 01 in the Yokohama area.

For example, the modular application (rApp) uses the "Resource Status Request/Response" IE to evaluate and determine statuses of vCU servers based on a predetermined perimeter around the location of the data center 01 in the Yokohama area.

To this end, the unutilized resources of data centers, in particular, vCU servers in data centers located in the vicinity of data center 01, can be utilized for allocating their hardware infrastructure resources to the data center 01 in the Yokohama area. For example, the modular application (rApp) creates a resource management policy to instantiate the new O-CU applications for a O-CU that runs on vCU cluster 01 in the Yokohama area on vCU servers of a vCU cluster 02 in Kawasaki.

This has the advantage that if the data center in Yokohama reaches its maximum hardware resource limit other data centers close to Yokohama can use their unutilized hardware resources to instantiate the new O-CU applications for O-CUs usually hosted in the data center in Yokohama.

Figure 9:
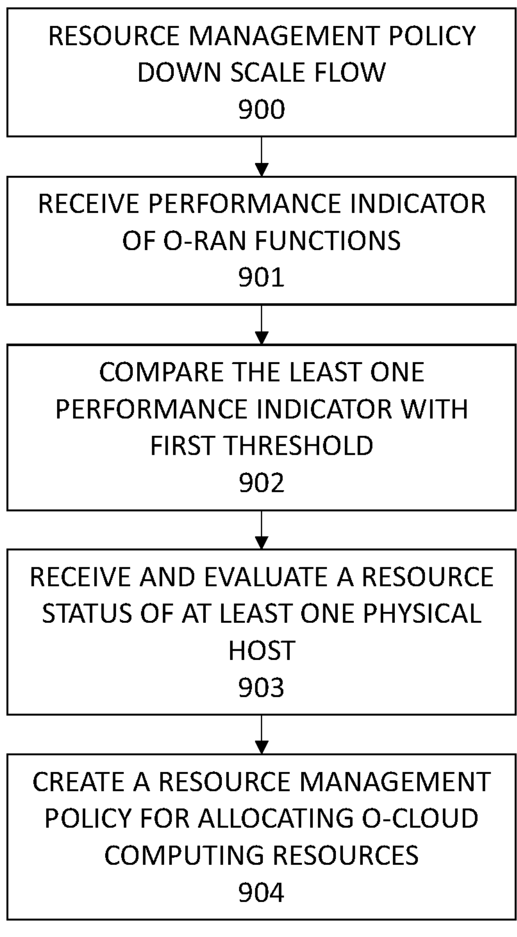
FIG. 9 shows a flowchart of a method of creating a resource management policy for allocating O-Cloud computing resources to scale down an O-CU according to an embodiment.

FIG. 9 shows a flowchart of a method 900 of creating a resource management policy for allocating O-Cloud computing resources to scale down an O-CU according to an embodiment. Referring to FIG. 9, similar to step 701, the modular application (rApp) obtains a performance indicator of an O-RAN function at step 901. In step 902, similar to step 702, the modular application (rApp) compares the performance indicator with a first threshold for down-scaling. Here, the first threshold may be a threshold that triggers a down-scaling request from the modular application (rApp).

In step 903, the modular application (rApp) receives and evaluates a resource status of at least one physical host accommodating O-Cloud computing resources ready to be allocated to, or allocated to, the O-CU.

Similar to FIGS. 7 and 8, the resource status may be obtained, for example, by the "Resource Status Response" IE or other resource states that may include one of a processor load, a memory usage, and a hard disk drive usage of the at least one physical node.

In step 904, the modular application (rApp) creates a resource management policy for allocating O-Cloud computing resources of the at least one physical host to one or more O-CU nodes to down scale the O-CU in at least one physical location in the O-Cloud computing environment based on the comparing (e.g., in step 902) and the evaluating (e.g., in step 903).

By way of example, an O-CU may be connected to a maximum of 18,000 UEs. The UEs are hosted in three separate pods each configured to host 6000 UEs. Two of the pods of three pods are terminated by the resource management policy, if the load of the O-CU (e.g., based on the comparison in step 902) is only 200 UEs.

Moreover, in a resource control mechanism in the related art, the O-CU always holds three pods in its basic configuration. Therefore, the minimum resource management policy to shut down two pods saves energy in the operation of the O-RAN network.

In a further embodiment, the resource management policy may include a failsafe down scaling, by applying an "N+1" redundancy. This means that, for example, despite a load of only 200 UEs, two pods are used, wherein the N+1 pod may be a hot spare which is held on stand-by to be linked to O-CU. Further, where 12,000 UEs are hosted on two O-CU pods or instantiations, a resource management failsafe policy in accordance with an example embodiment may apply the "N+1" redundancy (i.e., three pods) instead of an N+N redundancy, thereby achieving a minimum possible configuration and optimum/reduced energy requirement.

In a further embodiment, the resource management policy may include a policy for allocating pre-instantiated O-Cloud computing resources. These resources are, for example, pre-instantiated pods hosted on a vCU server. These pre-instantiated pods can be linked to an O-CU without the need to execute a resource management policy to instantiate a new pod for additional O-CU applications. The linking of pre-instantiated O-Cloud computing resources saves an instantiation time lag (e.g., approximately 20 s) as linking pre-instantiated pods is done within fractions of a second.

In a further embodiment, the resource management policy may include deploying a "N+1" redundancy and linking pre-instantiated pods to a O-CU. This resource management policy is energy efficient and allows for a flexible and fast allocation of O-Cloud computing resources for a fail safe operation of the O-RAN network.

According to one or more embodiments, a modular application (rApp) obtains and evaluates a resource status to create a resource management policy to terminate abundant O-CU applications of an O-CU, no matter of the location of the physical host running the abundant O-CU. This means, for example, O-CU applications of the O-CU in the Yokohama data center that run on vCU servers in the Kawasaki data center are terminated by the resource management policy in the same way as abundant O-CU applications in the O-CU in the Yokohama data center.

This resource management policy of down-scaling of hardware resources based on resource status of hardware resources in the O-RAN network topology is more energy efficient and provides for a resource management within the entire O-RAN network topology.

Figure 10:
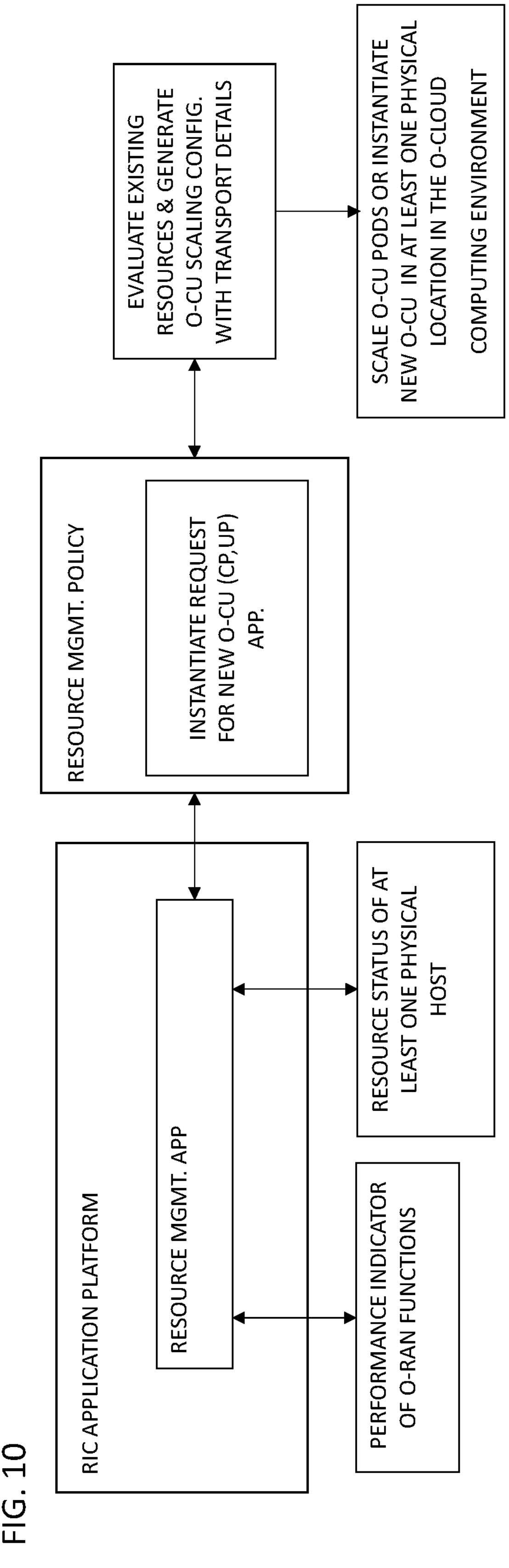
FIG. 10 is a diagram of an example environment for up-scaling an O-CU.
Figure 11:
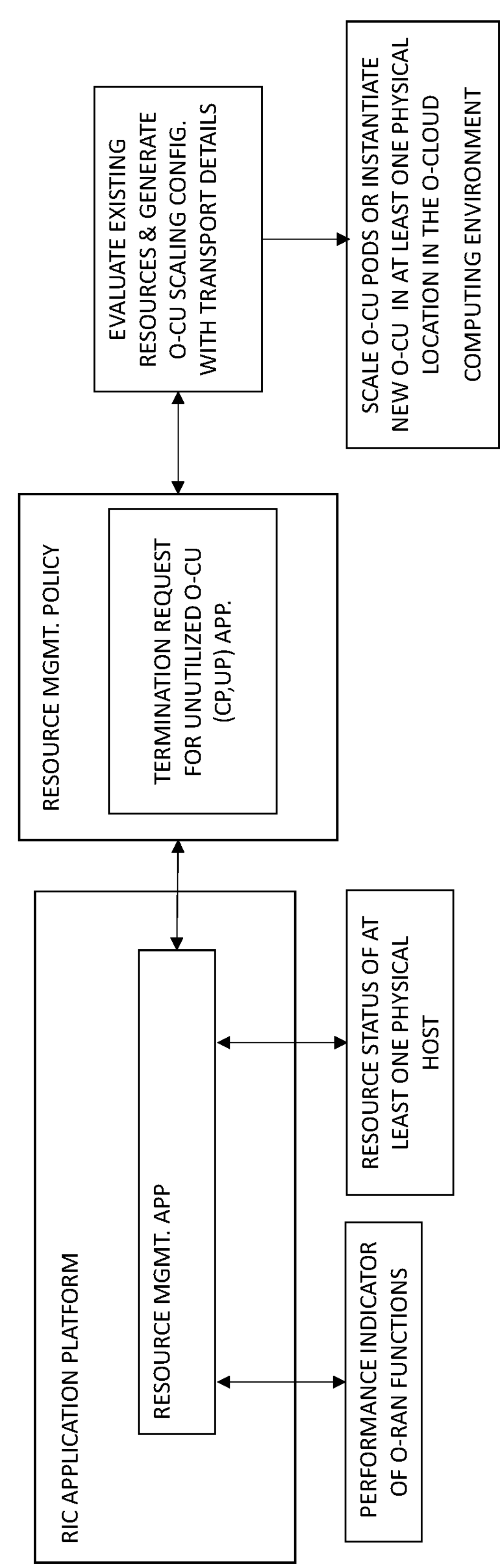
FIG. 11 is a diagram of an example environment for down-scaling an O-CU.

FIGS. 10 and 11 are diagrams of an example embodiment of a "up-scale operation" and "down-scale operation" controlled and implemented by a modular application (rApp), respectively, according to one or more embodiments.

Referring to FIG. 10, the modular application (rApp) obtains a performance indicator of O-RAN functions. The performance indicator may be pushed to the rApp (e.g., periodically or continuously) or may be pulled by the rApp (e.g., by periodic request, by event-triggered request (e.g., a threshold determination), etc.). Based on the obtained performance indicator, the modular application (rApp) compares this performance indicator with a threshold in order to trigger a scaling request or command. The request or command in the case of FIG. 10 is an up-scale request. Further, the modular application (rApp) obtains resource states from physical hosts within the O-RAN network topology. This may include physical host(s) that run the O-CU to be scaled and other physical host(s) which may be able to accommodate additional O-CU applications of the O-CU. Moreover, the modular application (rApp) obtains the transport details in order select a physical host with, for example, the lowest latency (e.g., the shortest path to the physical host of the O-CU to be scaled). The modular application may obtain and/or evaluate the transport details based on the comparison of the performance indicator to the threshold.

Still referring to FIG. 10, for example, the modular rAPP may communicate with the O-CU CP via the E2 and the E1 interface in order to obtain O-CU UP performance indicators, and via the F1 interface to obtain performance indicators from the O-DU, such as active UEs, UE traffic, data throughput, etc. Similarly, the resource status can be obtained by a "Resource Status Request/Response" IE.

In another example, the modular rAPP may communicate with the O-CU CP via the E2 and E1 interface to obtain the information element "Gnb-Cu-Up Status Indication". When the O-CU U-Plane reaches at 75% of its capacity, the threshold for an up-scaling request is reached the resource status of at least one physical host is evaluated. Based on the evaluation, new pods are instantiated or pre-instantiated pods are linked to the O-CU that reached 75% of its capacity.

The performance indicators are manifold and the list thereof not exhaustive. For example, among others, at least one performance indicator may include key performance indicators (KPIs) of a radio network layer, a transport network layer interface that connects O-CU's U-Plane or C-Plane, traffic of each of the user functions executed on a O-CU's U-Plane, at least one O-RAN system operation KPI of an O-CU, etc.

For example, a KPI can be a traffic status of an O-CU's U-Plane application usage, for example, if O-CU's U-Plane application is designed to carry ≤6 Gbps traffic for each micro service pod. In this case, a threshold can be set for the traffic of at least one user application executed on a user plane (U-Plane) of the at least one O-Cu node.

Furthermore, performance indicators may include at least one a system operation KPI, for example, the number of UE connected to O-CU U-Plane Pod and/or an O-CU internal system trigger overload threshold.

The resource status may be computation performance indicators, in particular, O-Cloud environment related computation performance indicators. Resource statuses (or states) of the at least one physical host may include at least one of a processor load, a memory usage, and a hard disk drive usage of the at least one physical host.

A resource status may include the most suitable location in accordance with the O-RAN network topology, which may include preferred locations based on, for example, at least one of a hardware infrastructure capacity of the at least one vCU server, transmission speed, traffic routing. The events for selecting a predetermined location of a data center are manifold not limited by the above examples. Selecting a preferred physical location in the O-RAN network may include at least one of the most suitable location described above and/or a predetermined physical location of a mobile operator, for example, a particular location in case of major disruption of the O-Cloud computing (e.g., a natural disaster, etc.).

For example, the modular application (rApp) may create a resource management policy that may include: determining the scope of where, how much and/or which new O-CU application (e.g., pod or microservice instantiation) should be instantiated. Based on a performance indicator comparison and selecting at least one vCU server or at least one vCU cluster in at least one data center to deploy the new application instantiation or resources (e.g., evaluating resource states that allow determining the most suitable location, the most suitable server and the most suitable amounts of pods to be instantiated).

Still referring to the FIG. 10, the modular application (rApp) may include: comparing key performance indicator (KPI) of each of the O-CU's C-Plane and U-Plane with a corresponding threshold; obtaining and evaluating a resource status and instantiating only the O-CU applications needed to be up-scaled, based on the comparing and the evaluating. This means that, based on the compared performance indicator comprising a performance indicator of an O-CU control plane (CP), the resource management policy is for allocating O-Cloud computing resources to scale the O-CU CP, and based on the compared at least one performance indicator comprising a performance indicator of an O-CU user plane (UP), the resource management policy is for allocating O-Cloud computing resources to scale the O-CU UP.

FIG. 11 shows a diagram of an example embodiment of a "down-scale operation" controlled and implemented by a modular application (rApp), according to an example embodiment. Similar to FIG. 10, the modular application (rApp) obtains a performance indicator of an O-RAN network function. Accordingly, the modular application (rApp) compares the performance indicator with a first threshold to trigger a termination request for an abundant O-CU. Further, the modular application (rApp) obtains the resource status of the abundant O-CU and/or the resource state of physical hosts which accommodated the abundant O-CU or parts thereof. Based on resource states and the transport details of the physical host(s) that may differ in location, the modular application (rApp) creates a resource management policy to terminate the abundant O-CU.

Still referring to the FIG. 11, the modular application (rApp) may create a resource management policy that includes a failsafe configuration. For example, instead of a N+N redundancy, an N+1 redundancy for failsafe may be configured as a result of the flexibility afforded by the resource control mechanism in accordance with example embodiments. As a result, a robust and energy efficient operation of the RAN in the O-Cloud environment may be achieved. This decrease in O-Cloud resources allows for a more energy efficient operation of the O-RAN.

Still referring to the FIG. 11, the modular application (rApp) may include: selecting at least one of an O-CU's C-Plane application or O-CU's U-Plane application; comparing key performance indicator (KPI) of said applications with a threshold; obtaining and evaluating a resource status and terminating only the O-CU applications needed to be down scaled, based on the comparing and the evaluating. This means that, based on the compared performance indicator comprising a performance indicator of an O-CU control plane (CP), the resource management policy is for allocating O-Cloud computing resources to scale the O-CU CP, and based on the compared at least one performance indicator comprising a performance indicator of an O-CU user plane (UP), the resource management policy is for allocating O-Cloud computing resources to scale the O-CU UP.

FIG. 12 illustrates a table showing resource statuses of vCU servers in an O-Cloud computing environment. The resource states per vCU server may include the percentage of cores in use out of the total number of cores available per vCU server, the percentage of cores in use out of the number of isolated cores per vCU server, the percentage of cores in use out of the number of dedicated core per vCU server, the CPU status per vCU server, the hard disk allocation per vCU server, the system usage per vCU server, the role of the vCU server within a vCU cluster and the operation status of the vCU server.

According to embodiments, apparatuses and methods are provided for evaluating, controlling and executing of resource management control policies created by a modular application rApp hosted in a radio access network (RAN) Intelligent Controller (RIC), where the policies implement a scaling of O-CUs based on a consideration of resource statuses of the underlying cloud hardware resources. As a result, efficient scaling and operation of O-CU instantiations may be achieved and a shortage of hardware resources at a particular cluster or data center (e.g., due to a traffic surge) may be prevented.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. An apparatus for implementing an application hosted in a radio access network (RAN) Intelligent controller (RIC)

within a Service Management and Orchestration (SMO) framework of a telecommunications network, the apparatus comprising:

a memory storing instructions; and at least one processor within the SMO framework for implementing the RIC, the at least one processor configured to execute the instructions to:

receive data comprising at least one performance indicator from an Open RAN (O-RAN) centralized unit (O-CU) in an O-Cloud computing environment, wherein the at least one performance indicator comprises a performance indicator of the O-CU;

compare the least one performance indicator with a first predetermined threshold;

receive and evaluate a resource status of at least one physical host in the O-Cloud computing environment; and create a resource management policy for allocating O-Cloud computing resources of the at least one physical host to scale the O-CU in at least one physical location in the O-Cloud computing environment based on the comparing and the evaluating, wherein the at least one physical location is selected from among plural physical locations based on the evaluating, according to location information of the plural physical locations, wherein the at least one processor is further configured to execute the instructions to create the resource management policy based on location information of the at least one physical host, to consider a shortest path to move traffic based on available resources.

2. The apparatus as claimed in claim 1, wherein:

the resource management policy is for allocating O-Cloud computing resources to scale up the O-CU by instantiating an additional O-CU; and the at least one processor is further configured to execute the instructions to:

receive an additional performance indicator of the O-CU, the additional performance indicator corresponding to a same performance metric as the at least one performance indicator but at a later time point, compare the additional performance indicator of the O-CU to a second predetermined threshold, different from the first predetermined threshold, and determine to scale down by terminating the additional O-CU based on the comparing.

3. The apparatus as claimed in claim 1, wherein:

based on the compared at least one performance indicator comprising a performance indicator of an O-CU control plane (CP), the resource management policy is for allocating O-Cloud computing resources to scale the O-CU CP; and based on the compared at least one performance indicator comprising a performance indicator of an O-CU user plane (UP), the resource management policy is for allocating O-Cloud computing resources to scale the O-CU UP.

4. The apparatus as claimed in claim 3, wherein the performance indicator of the O-CU CP comprises a number of connected devices, and the performance indicator of the O-CU UP comprises an amount of traffic or a number of active devices.

5. The apparatus as claimed claim 1, wherein the at least one processor is further configured to execute the instructions to:

based on N number of instantiated O-CUs in accordance with the resource management policy, implement a failsafe policy in which a single additional redundancy is instantiated as a failsafe for the N number of instantiated O-CUs, wherein N is a whole number greater than 1.

6. The apparatus as claimed in claim 1, wherein the resource management policy is for upscaling the O-CU by instantiating an additional O-CU at a physical host at a different data center than a data center of the O-CU, based on the evaluated resource status of physical hosts in the data center of the O-CU.

7. The apparatus as claimed in claim 1, wherein the resource status of the at least one physical host comprises at least one of a hardware processor load, a memory usage, and a hard disk drive usage of the at least one physical host.

8. A method, performed by an application hosted in a radio access network (RAN) Intelligent controller (RIC) within a Service Management and Orchestration (SMO) framework of a telecommunications network, of implementing a resource control mechanism, the method comprising:

receiving data comprising at least one performance indicator from an Open RAN (O-RAN) centralized unit (O-CU) in an O-Cloud computing environment, wherein the at least one performance indicator comprises a performance indicator of the O-CU;

comparing the least one performance indicator with a first predetermined threshold;

receiving and evaluate a resource status of at least one physical host in the O-Cloud computing environment; and creating a resource management policy for allocating O-Cloud computing resources of the at least one physical host to scale the O-CU in at least one physical location in the O-Cloud computing environment based on the comparing and the evaluating, wherein the at least one physical location is selected from among plural physical locations based on the evaluating, according to location information of the plural physical locations, wherein the creating the resource management policy comprises creating the resource management policy based on location information of the at least one physical host, to consider a shortest path to move traffic based on available resources.

9. The method as claimed in claim 8, wherein:

the resource management policy is for allocating O-Cloud computing resources to scale up the O-CU by instantiating an additional O-CU; and the method further comprises:

receiving an additional performance indicator of the O-CU, the additional performance indicator corresponding to a same performance metric as the at least one performance indicator but at a later time point, comparing the additional performance indicator of the O-CU to a second predetermined threshold, different from the first predetermined threshold, and determining to scale down by terminating the additional O-CU based on the comparing.

10. The method as claimed in claim 8, wherein:

based on the compared at least one performance indicator comprising a performance indicator of an O-CU control plane (CP), the resource management policy is for allocating O-Cloud computing resources to scale the O-CU CP; and based on the compared at least one performance indicator comprising a performance indicator of an O-CU user plane (UP), the resource management policy is for allocating O-Cloud computing resources to scale the O-CU UP.

11. The method as claimed in claim 8, wherein the performance indicator of the O-CU CP comprises a number of connected devices, and the performance indicator of the O-CU UP comprises an amount of traffic or a number of active devices.

12. The method as claimed in claim 8, further comprising:

based on N number of instantiated O-CUs in accordance with the resource management policy, implementing a failsafe policy in which a single additional redundancy is instantiated as a failsafe for the N number of instantiated O-CUs, wherein N is a whole number greater than 1.

13. The method as claimed in claim 8, wherein the resource management policy is for upscaling the O-CU by instantiating an additional O-CU at a physical host at a different data center than a data center of the O-CU, based on the evaluated resource status of physical hosts in the data center of the O-CU.

14. The method as claimed in claim 8, wherein the resource status of the at least one physical host comprises at least one of a hardware processor load, a memory usage, and a hard disk drive usage of the at least one physical host.

15. A non-transitory computer-readable recording medium within a Service Management and Orchestration (SMO) framework of a telecommunications network, having recorded thereon instructions executable by at least one processor to perform a method of implementing a resource control mechanism, the method comprising:

receiving data comprising at least one performance indicator from an Open RAN (O-RAN) centralized unit (O-CU) in an O-Cloud computing environment, wherein the at least one performance indicator comprises a performance indicator of the O-CU;

comparing the least one performance indicator with a first predetermined threshold;

receiving and evaluate a resource status of at least one physical host in the O-Cloud computing environment; and creating a resource management policy for allocating O-Cloud computing resources of the at least one physical host to scale the O-CU in at least one physical location in the O-Cloud computing environment based on the comparing and the evaluating, wherein the at least one physical location is selected from among plural physical locations based on the evaluating, according to location information of the plural physical locations, wherein the creating the resource management policy comprises creating the resource management policy based on location information of the at least one physical host, to consider a shortest path to move traffic based on available resources.

16. The non-transitory computer-readable recording medium as claimed in claim 15, wherein the method further comprises:

receiving an additional performance indicator of the O-CU, the additional performance indicator corresponding to a same performance metric as the at least one performance indicator but at a later time point, comparing the additional performance indicator of the O-CU to a second predetermined threshold, different from the first predetermined threshold, and determining to scale down by terminating the additional O-CU based on the comparing.

17. The non-transitory computer-readable recording medium as claimed in claim 15, wherein the resource management policy is for upscaling the O-CU by instantiating an additional O-CU at a physical host at a different data center than a data center of the O-CU, based on the evaluated resource status of physical hosts in the data center of the O-CU.

* * * * *